(12) United States Patent
Patel et al.

(10) Patent No.: US 9,021,379 B1
(45) Date of Patent: Apr. 28, 2015

(54) MATCHING OF GESTURE KEYBOARD STROKES WITH PREDEFINED STROKE TEMPLATES

(75) Inventors: Nirmal J. Patel, Mountain View, CA (US); Thad E. Starner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 720 days.

(21) Appl. No.: 13/290,831

(22) Filed: Nov. 7, 2011

Related U.S. Application Data

(60) Provisional application No. 61/509,871, filed on Jul. 20, 2011.

(51) Int. Cl.
G06F 3/0488 (2013.01)
G06F 3/041 (2006.01)

(52) U.S. Cl.
CPC .................................... G06F 3/0416 (2013.01)

(58) Field of Classification Search
CPC ... G06F 3/0425; G06F 3/0426; G06F 3/0428; G06F 3/04883; G06F 3/04886; G06F 3/012

USPC .............. 715/773, 863, 864; 345/168, 173; 382/229

See application file for complete search history.

(56) References Cited

U.S. PATENT DOCUMENTS

| | | | |
|---|---|---|---|
| 2005/0190973 A1* | 9/2005 | Kristensson et al. | 382/229 |
| 2007/0040813 A1* | 2/2007 | Kushler et al. | 345/173 |
| 2011/0214082 A1* | 9/2011 | Osterhout et al. | 715/773 |

* cited by examiner

Primary Examiner — Nicholas Ulrich
Assistant Examiner — Shangao Zhang
(74) Attorney, Agent, or Firm — McDonnell Boehnen Hulbert & Berghoff LLP

(57) ABSTRACT

A method is provided for determining a word input by a gesture stroke on a virtual keyboard. The method includes receiving data representing the gesture stroke, analyzing the data to identify a set of dwell points in the gesture stroke, generating a simplified stroke defining a polyline having vertices corresponding with the dwell points of the identified set. The method further includes comparing the simplified stroke polyline with a plurality of predefined polylines each representing a respective word, to determine a closest matching polyline. The computing system outputs the word represented by the closest matching polyline.

13 Claims, 12 Drawing Sheets

MATCHING OF GESTURE KEYBOARD STROKES WITH PREDEFINED STROKE TEMPLATES

CROSS-REFERENCE TO RELATED APPLICATIONS

The present application claims priority under 35 § U.S.C. 119(e) to U.S. Provisional Patent Application Ser. No. 61/509,871, filed Jul. 20, 2011, which is incorporated herein by reference in its entirety.

BACKGROUND

Unless otherwise indicated herein, the materials described in this section are not prior art to the claims in this application and are not admitted to be prior art by inclusion in this section.

Most mobile or portable personal computers have been designed without a physical keyboard, and use touch-screen based input methods as the primary form of human computer interface. As such, graphical user interfaces (GUI), which include virtual keyboards, have become increasingly popular with users. Typical touch-screen based mobile computers enable the use of gestures or strokes as input methods. Strokes are symbols entered on the touch screen by a pointing device, such as a finger or a stylus, indicative of a specific command from the user.

Moreover, typical touch-screen based mobile computers are equipped with limited screen space. As such, it becomes difficult for the user to input data or text as fast possible via strokes, on the limited keyboard space, without adversely affecting accuracy.

SUMMARY

Disclosed herein are improved methods, systems, and devices for matching gesture keyboard strokes with predefined stroke templates.

In one embodiment, a method is provided for determining a word input by a gesture stroke on a virtual keyboard. The method includes receiving data representing the gesture stroke, analyzing the received data to identify a set of dwell points in the gesture stroke, generating a simplified stroke defining a polyline having vertices corresponding to the dwell points of the identified set. The method further includes comparing the simplified stroke polyline with a plurality of predefined polylines, each representing a respective word, to determine a closest matching predefined polyline. The computing system outputs the word represented by the closest matching polyline.

In another embodiment, a computing system includes a display device configured to display keys constituting a virtual keyboard, a touch pad positioned on the display device, and configured to generate a signal indicative of a touch point on the touchpad in an area associated with the virtual keyboard, a memory unit storing program instructions directed to the method for determining a word input by a gesture stroke on the virtual keyboard, and a processor unit operatively coupled to the memory unit, the touchpad, and the display device, and configured to execute the method.

In another embodiment, a non-transitory computer readable storage medium contains instructions that cause a computing system to perform the method discussed above.

In yet another embodiment, a head-wearable display device includes a display element for displaying keys constituting a virtual keyboard, a touch pad configured to generate a signal indicative of a touch point on the touchpad in an area associated with the virtual keyboard, a memory unit storing program instructions directed to a method for determining a word input by a gesture stroke on a virtual keyboard, and a processor operatively coupled to the memory, the touchpad, and the image projecting unit, and configured to execute the method discussed above.

These as well as other aspects, advantages, and alternatives will become apparent to those of ordinary skill in the art by reading the following detailed description, with reference where appropriate to the accompanying drawings. Further, it should be understood that this summary section and the rest of this document are intended to discuss the provided disclosure by way of example only and not by way of limitation.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The methods, systems, and apparatuses or devices disclosed herein generally relate to determining a word input by a gesture stroke on a virtual keyboard. In one example, the method includes determining a word entered through a continuous polyline gesture stroke on a virtual keyboard, so as to facilitate entry of the word into a computing system (e.g., display of the word on a display screen). In advance of initiating or performing the method, each word in a dictionary is assumed to have been mapped to a respective polyline with each subsequent letter of the word defining a corresponding vertex of the polyline. Further, each word's polyline may be sampled and stored as a sequence of N equidistant points (coordinates) along the polyline. The goal is to then receive user interface input (e.g., touchpad, mouse, head tracking, etc.) representing a stroke moving around the keyboard space, and to pattern match that stroke to one of the predefined polylines (predefined strokes) so as to identify the word represented by the user interface input.

Figure 1:
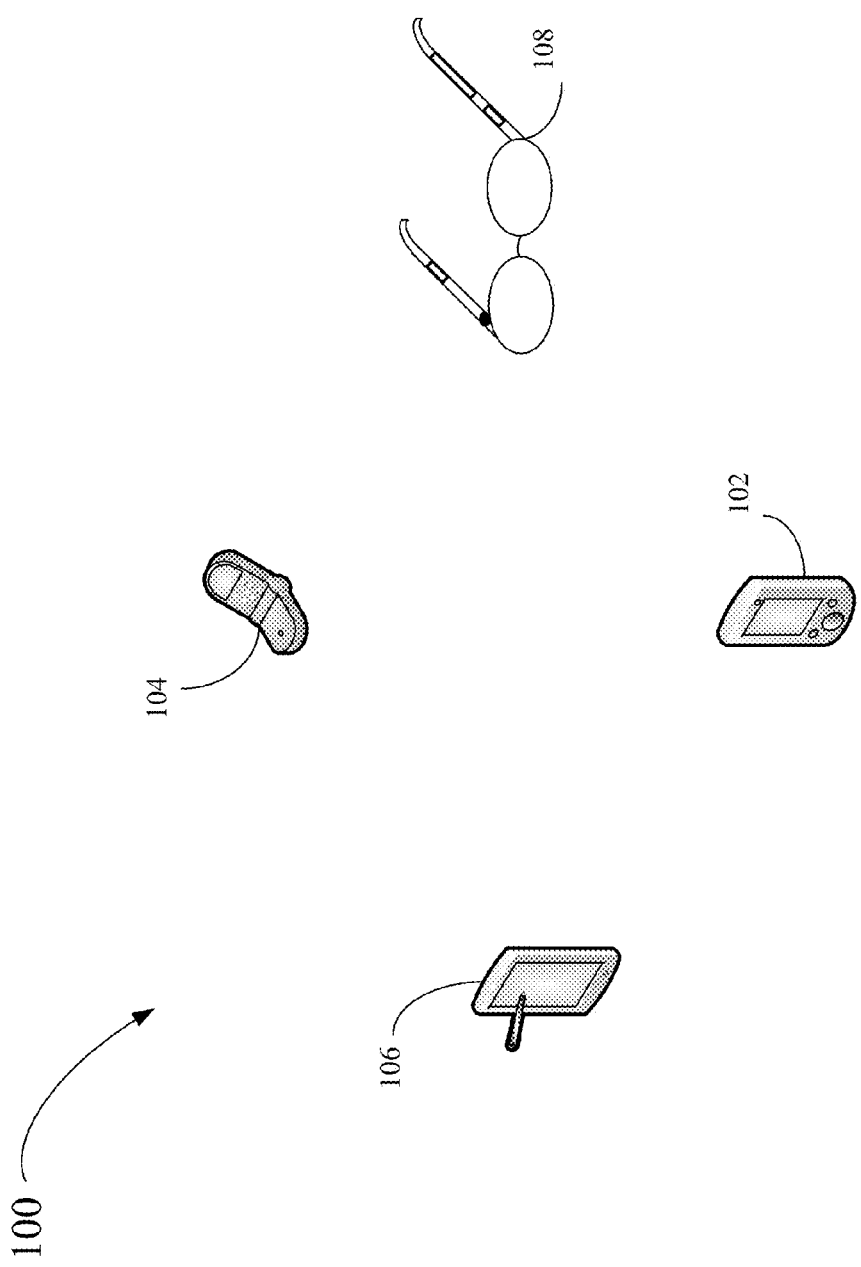
FIG. 1 illustrates a plurality of example embodiments of computing devices, which include operating systems in which a method for determining a word input by a gesture stroke on a virtual keyboard can be performed.

FIG. 1 illustrates a plurality of embodiments of computing devices, in which a method for determining a word input by a gesture stroke on a virtual keyboard can be performed. The plurality of computing device embodiments may include a personal data assistant (PDA) 102, a cellular phone 104, a tablet computer 106, a personal media player device (not shown), a personal headset device (not shown), or a hybrid device that includes any of the above functions. In one embodiment, computing device 100 may be a personal computer or laptop computer (not shown) coupled to a touch screen monitor (not shown). In another embodiment, computing device 100 may be a head wearable display device 108.

Figure 2:
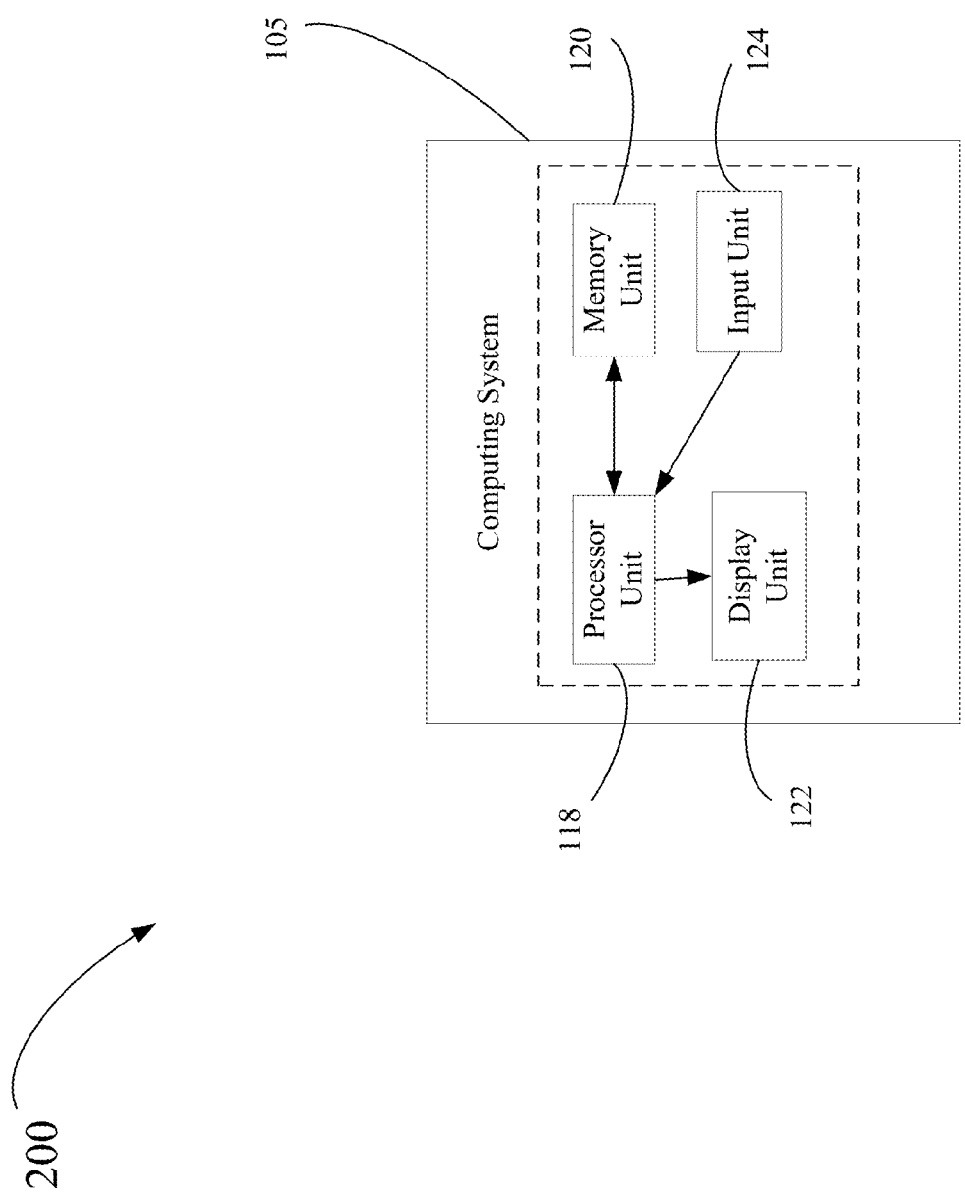
FIG. 2 is a schematic view of one example embodiment of a computing system associated with one of the computing devices of FIG. 1.

Each of computing devices 102-108 may include a computing system 105, shown in FIG. 2, which in turn includes a processor unit 118, a memory unit 120, a display unit 122, and an input unit 124. Processor unit 118 is configured to execute instructions and to carry out operations associated with computing system 105. For example, using instructions retrieved from memory unit 120, processor unit 118 may control the reception and manipulation of input and output data between components of computing system 105. Processor unit 118 can be implemented on a single-chip, multiple chips or multiple electrical components. For example, various architectures can be used for processor unit 118, including dedicated or embedded processor, single purpose processor, controller, application-specific integrated circuit (ASIC), and so forth. In most cases, processor unit 118 together with an operating system operates to execute computer code and produce and use data.

Figure 3:
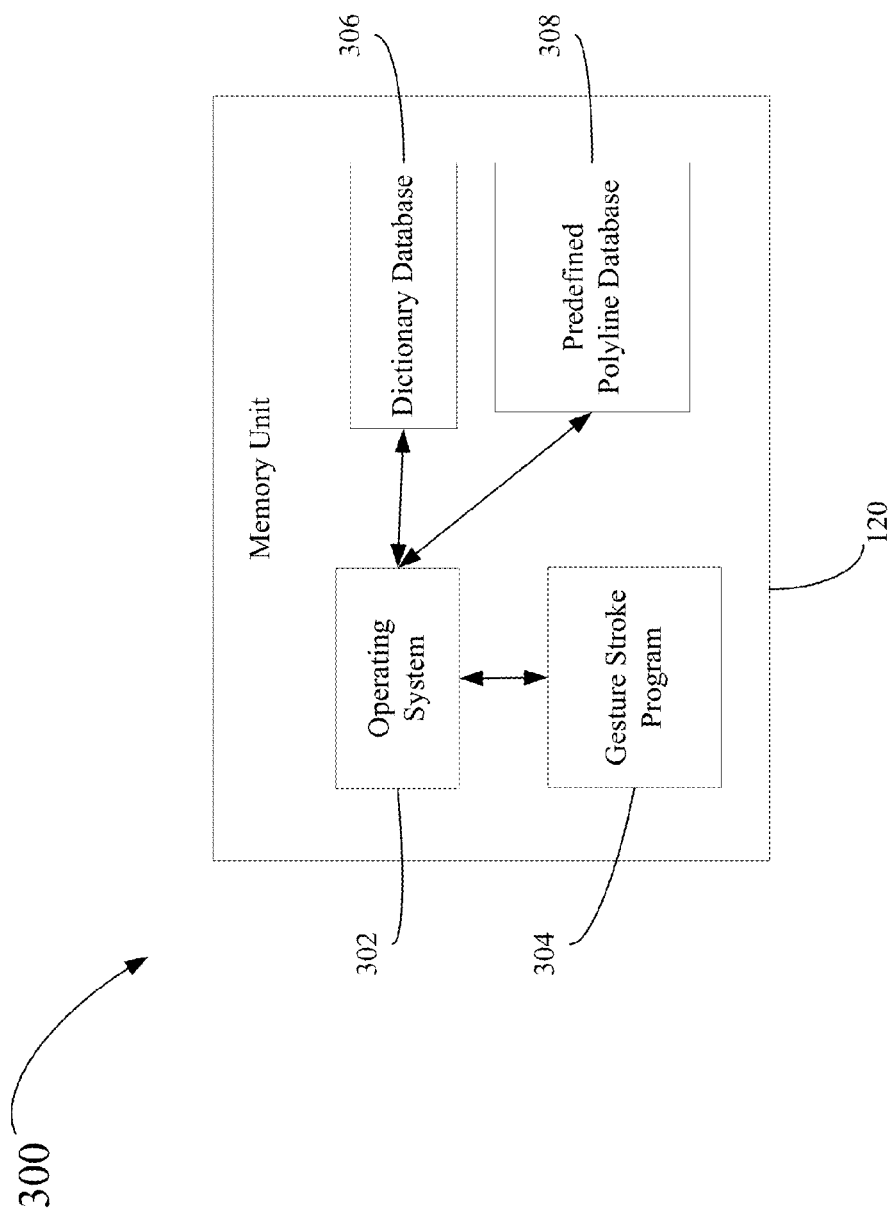
FIG. 3 is a block diagram illustrating example components of a memory unit of a computing device shown in FIG. 1.

As shown in FIG. 3, memory unit 120 generally provides a place to store computer code and data that are used by computing system 105. Memory unit 120 may include read-only memory (ROM), random-access memory (RAM), a hard disk drive and/or the like. Memory unit 120 includes an operating system 302, a gesture stroke program 304, a dictionary database 306, and a predefined polyline database 308.

Display unit 122, operatively coupled to processor unit 118 may be a liquid crystal display (LCD) (e.g., active matrix, passive matrix and the like), a light-emitting diode (LED) display, a plasma display, a display implemented with electronic inks, or any other desirable display. Additionally, display unit 122 may include input characteristics of input unit 124, by displaying a GUI (not shown) that can provide an easy to use interface between a user of computing system 105 and the operating system or an application running thereon. In one embodiment, display unit 122 may include a substantially reduced screen, such as the ones associated with PDA 102, cell phone 104, tablet or notebook 106, and head wearable display device 108. In another embodiment, display unit 122 may include a monitor size touch screen. An example of a touch screen, reduced or monitor size, is illustrated in FIG. 4.

Figure 4:
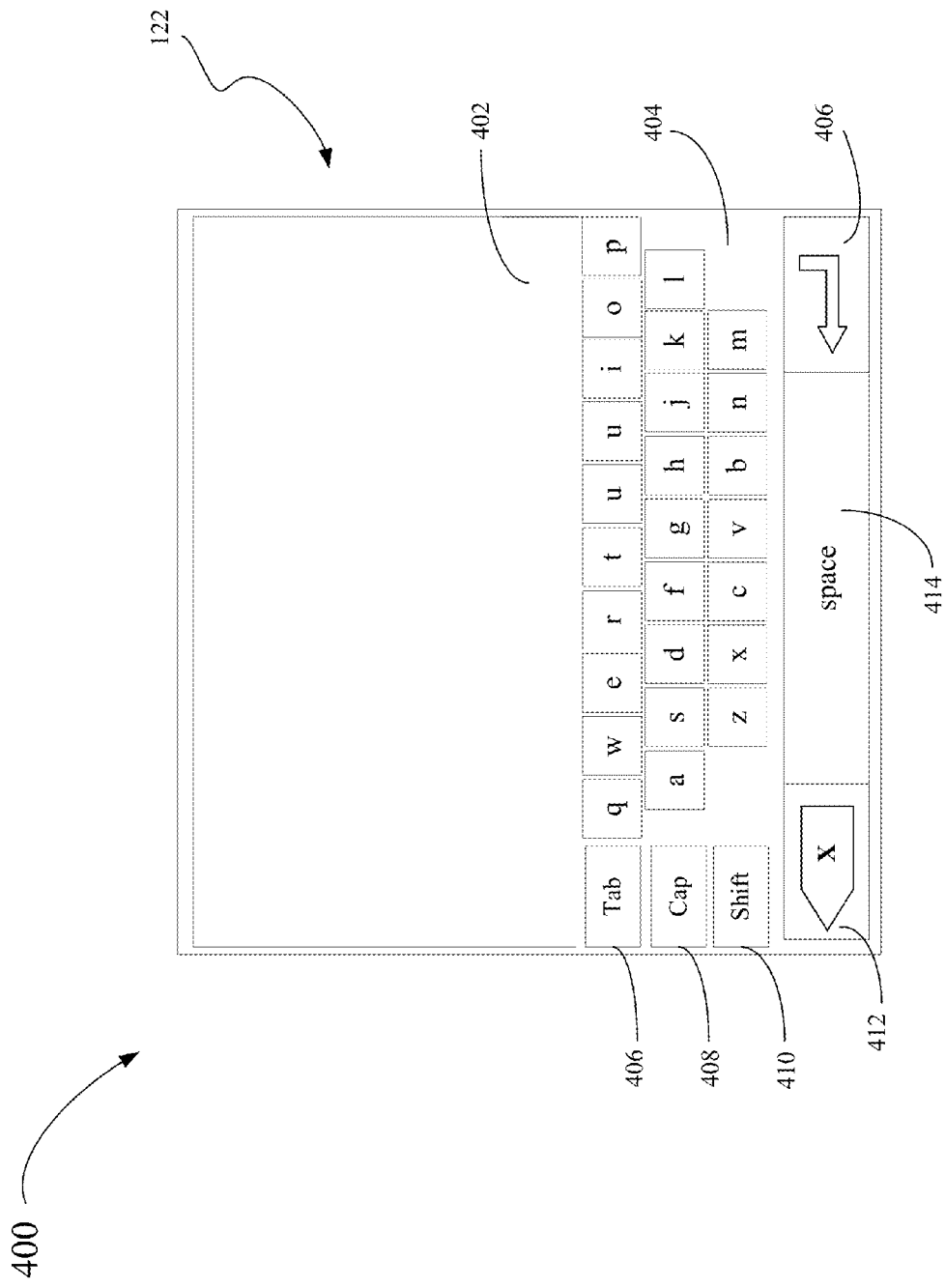
FIG. 4 illustrates an example embodiment of a touch-screen display unit on which a virtual keyboard is displayed.

As shown in FIG. 4, in one embodiment, display unit 122 is configured to provide an interface screen 402 that includes a virtual keyboard 404. The virtual keyboard 404 may hold letters, in a QWERTY format for example, digits, and symbols, depending on the mode of the keyboard. Virtual keyboard 404 further includes a Tab key 406, a Cap key 408, a Shift key 410, a Backspace key 412, a Space key 414, and an Enter key 416. In addition to or instead of the embodiment shown in FIG. 4, display unit 122 may include anyone of other numerous display and user interface arrangements.

Input unit 124, operatively coupled to processor unit 118, may be used to make selections with respect to the GUI on display unit 122, for example. Input unit 124 may also be used to issue commands to processor unit 118. Input unit 124 may include a touch sensing element, which is configured to receive input from a user's touch and to send this input to processor unit 118. Alternatively, input unit 124 may include a proximity sensing element, which is configured to receive input when the user's finger is within a predetermined distance from a surface of the proximity sensing element and to send this input to processor unit 118. For the sake of simplicity, hereafter input unit 124 will be considered to include a touch sensing element. The touch sensing element may be a touchpad or a touch screen, each of which may be configured to recognize touch points, in terms of coordinates of their positions as well as their magnitudes on a corresponding touch sensitive surface. Input unit 124 is configured to report data corresponding to the touch points to processor unit 118, which may interpret the data in accordance with software programming. For example, processor unit 118 may initiate a task in accordance with a particular touch. The touch sensing element may be based on sensing technologies including but not limited to capacitive sensing, resistive sensing, surface acoustic wave sensing, pressure sensing, optical sensing, and/or the like. Additionally, the touch sensing element may be configured to detect a single touch point or a plurality of simultaneous touch points.

Input unit 124 may be a touch screen that is integrated with display unit 122. As such, input 124 unit may be positioned in front, behind, or within a display element of the display unit. When integrated with display unit 122, input unit 124 enables the user to manipulate the GUI directly. For example, the user can simply touch with his/her finger or a stylus a location on the touch screen corresponding to a displayed text or image to be controlled or manipulated. As a touchpad, input unit 124 may be separate from display unit. The touchpad may provide a sensing surface for sliding a finger or a stylus, e.g., in a manner analogous to use of a mouse to scroll through a text or an image or to generate a scrolling gesture or motion. Moreover, the touchpad sensing surface can be tapped instead of pressing a button of the mouse.

During operation, information is input into computing system 105 by the user's finger or stylus touching the touch sensing element of input unit 124. Information concerning the location of the user's finger or stylus on input unit 124 is communicated to processor unit 118. In practice, this information may comprise the Cartesian (i.e., x & y) coordinates of the corresponding touch point on input unit 124 on which the user's finger or stylus is positioned. Processor unit 118 then processes the information via a corresponding application program stored in memory unit 120. Processor unit 118 may then produce data that is output to display unit 122 to produce appropriate texts or images on its screen.

Figure 5:
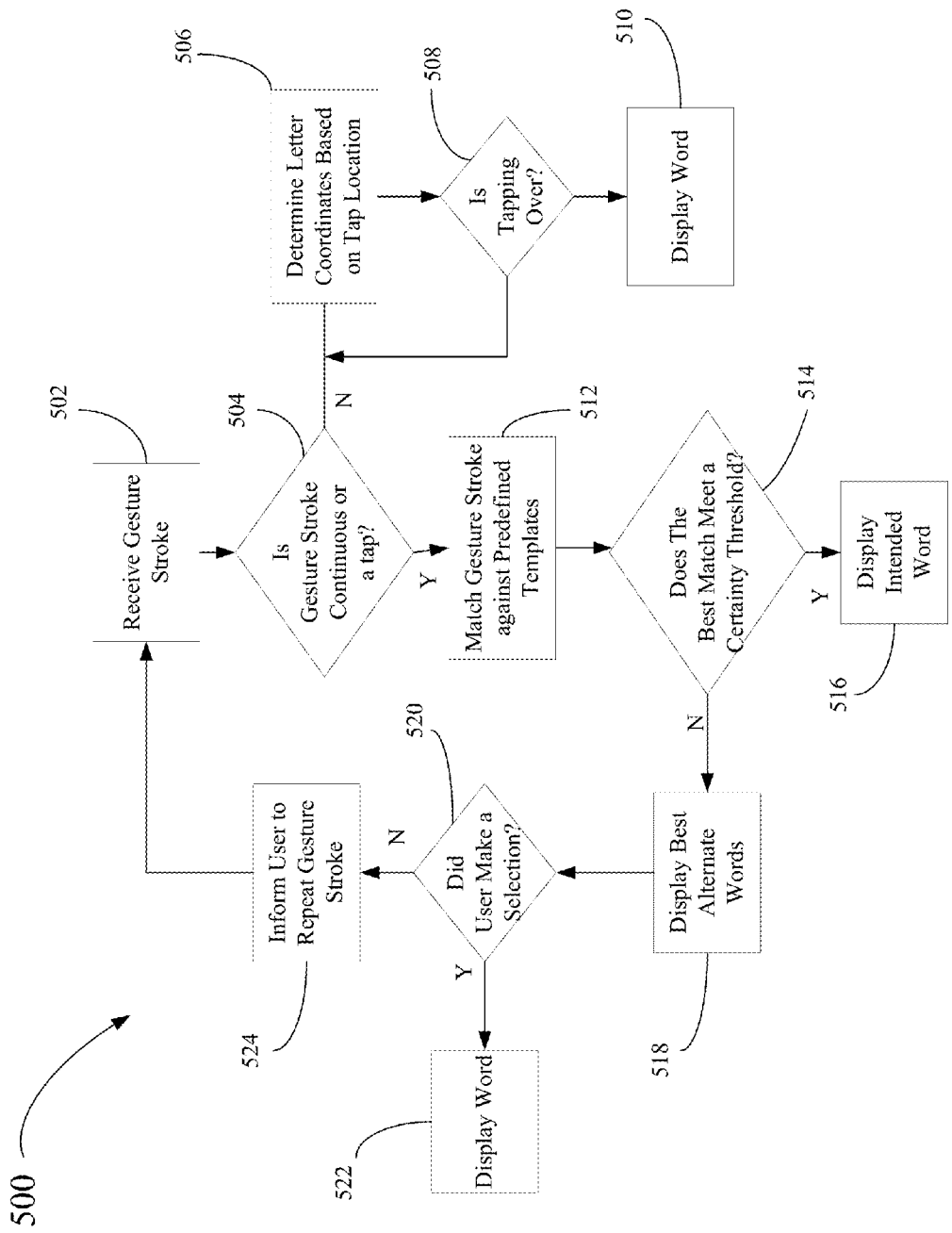
FIG. 5 is a flow diagram illustrating an exemplary method for determining a word input by a gesture stroke on a virtual keyboard.

With reference to FIG. 5, a method 500 for determining a word input by a gesture stroke on a virtual keyboard is illustrated by a high-level flow diagram. At block 502, computing system 105 receives as user interface input, a gesture stroke formed by the user's finger or stylus moving around on virtual keyboard 404. At block 504, computing system 105 determines whether the gesture stroke is a substantially continuous stroke or a tap. In case of a tap, computing system 105 is configured to select letters individually on the virtual keyboard. The computing system 105 is configured to match the user's tap location with a letter by matching the location of the tap with keyboard coordinates at block 506, and by generating the corresponding letter. Computing system 105 then determines whether the tapping has stopped, at block 508. Upon determination that the tapping has stopped, computing system 105 may display the generated sequence of letters, which may represent a word, at block 510.

Figure 6:
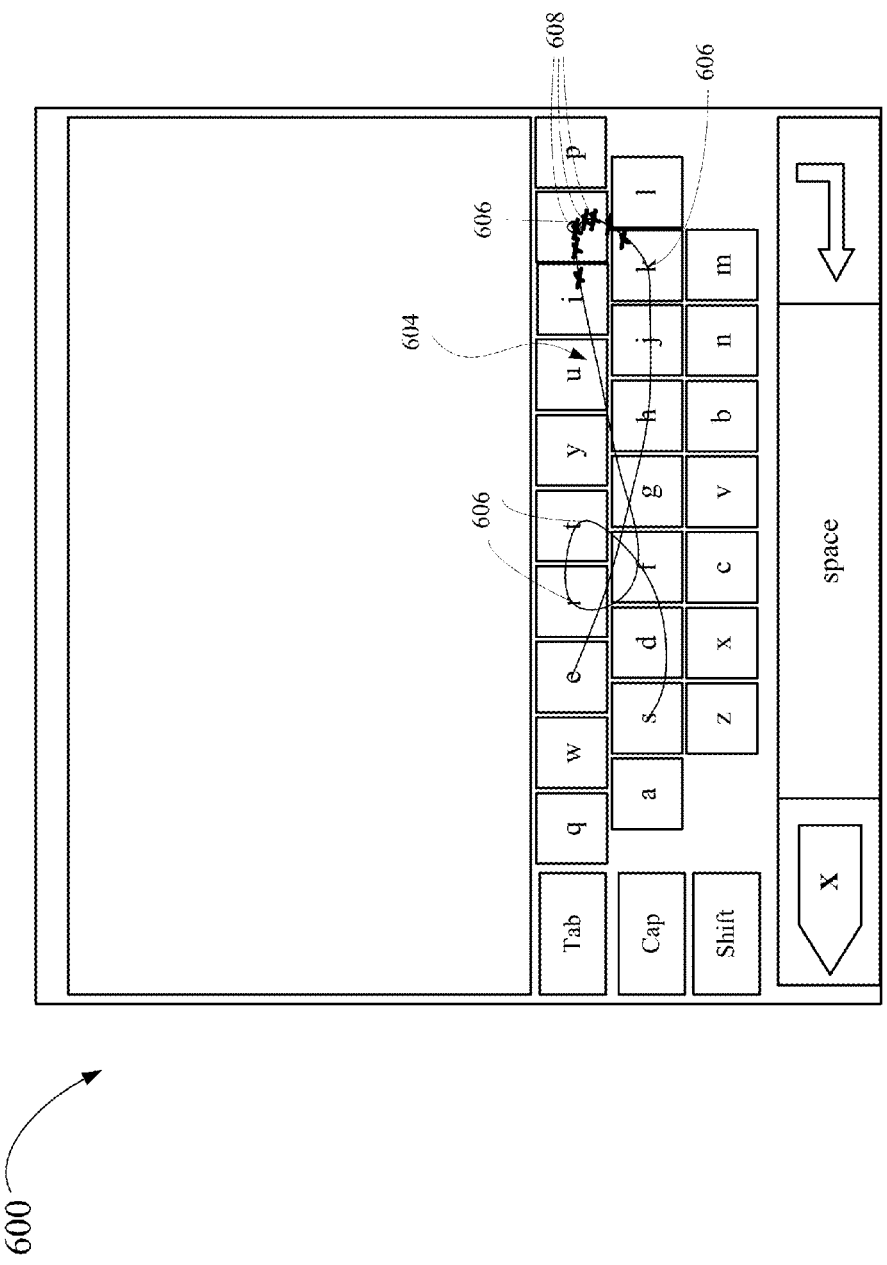
FIG. 6 is an example of a gesture stroke performed by the user on the virtual keyboard of FIG. 4.

In case of a continuous gesture stroke, as shown in FIG. 6, computing system 105 performs a matching determination, which involves comparing the received or detected gesture stroke against a set of predefined word or stroke templates, at block 512. Computing system 105 then determines whether one of the predefined stroke templates meets a predetermined matching certainty threshold, at block 514. Upon determination of a best match that satisfies the certainty threshold, computing system 105 is configured to display the matched word, at block 516. In case of a lack of a best match, computing system 105 displays to the user a list of best alternate words, at block 518. If computing system 105 receives a word selection for the displayed list of best alternate words, at block 520, the selected word is displayed to the user, at block 522. In case no selection is received, computing system 105 informs the user to repeat his gesture stroke or tap in his/her desired word, at block 524.

Figure 8:
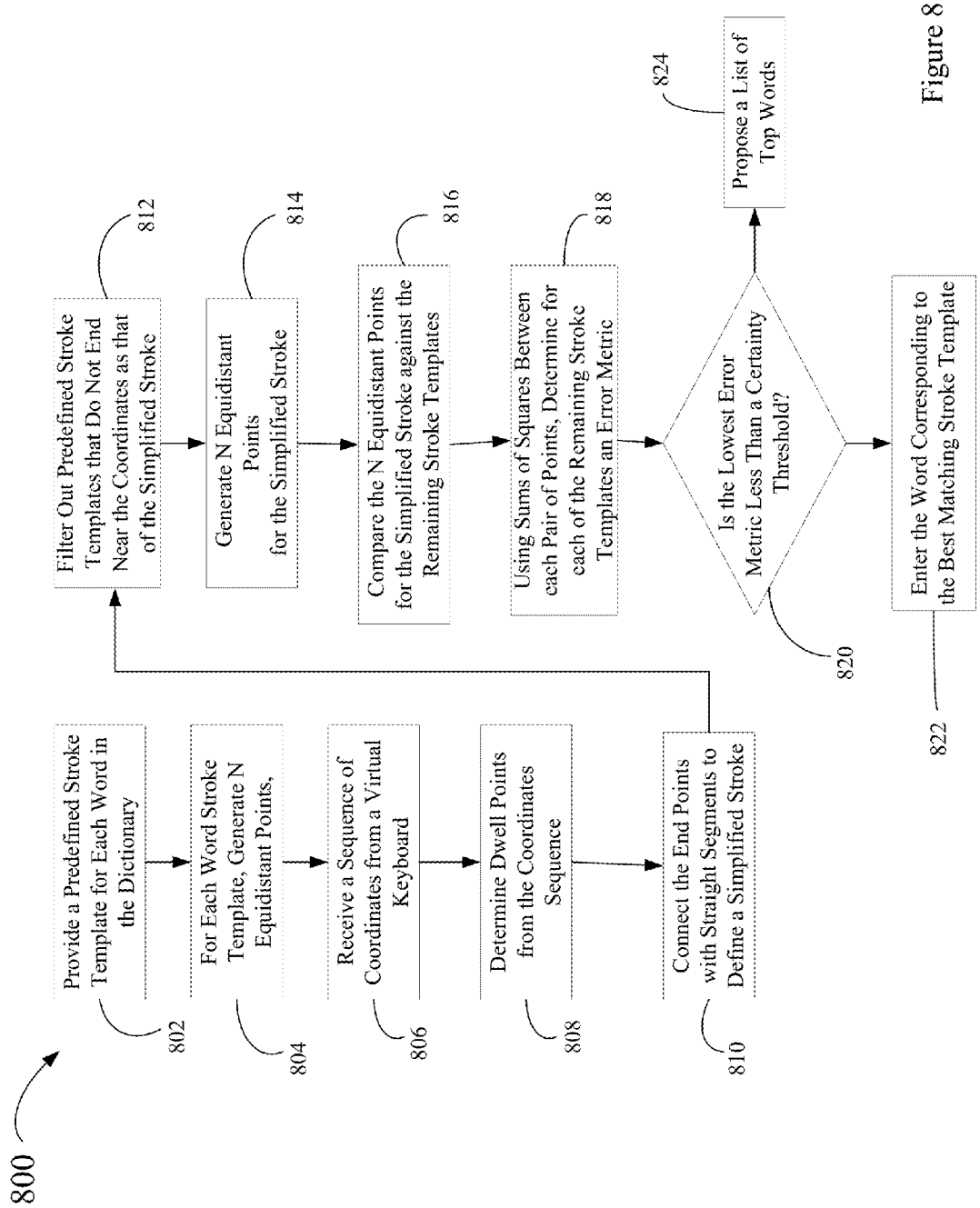
FIG. 8 is a flow diagram illustrating an exemplary method for comparing a simplified gesture stroke to a plurality of predefined stroke templates.

Now referring to FIG. 8, as stated above, the word matching determination involves comparing the received or detected gesture stroke against a set of predefined word or stroke templates. In one embodiment, computing system 105 is initialized by providing a stroke template for each word in a dictionary, at block 802. The stroke template is defined as a sequence of coordinates in the space of keyboard 404. As such, each of a letter in a word contributes its coordinates, corresponding to its location on the keyboard, to the sequence of coordinates according to its letter position in the word. Starting with an empty sequence, for each non-repeating letter in a word that represent a vertex of a corresponding polyline, the letter's coordinates are added to the sequence, thereby providing coordinates for each vertex of the word's polyline. The polyline is then re-sampled to generate N equidistant points, and stored along with the generated N equidistant points in predefined polyline database 308, at block 804.

During operation, computing system 105 receives a sequence of coordinates in the space of the keyboard, at block 806. As stated above, these coordinates can be generated via a number of user interfaces, such as a trackpad, a mouse, a head tracking system, for example. The sequence of coordinates starts with the position at which the user's finger or stylus landed on the keyboard. The sequence of coordinates continues while the user's finger or stylus is dragged to the individual letters of the intended word. The sequence of coordinates ends when the user's finger or stylus is lifted off the keyboard, indicating that the user has entered all of the letters of the intended word.

Figure 7:
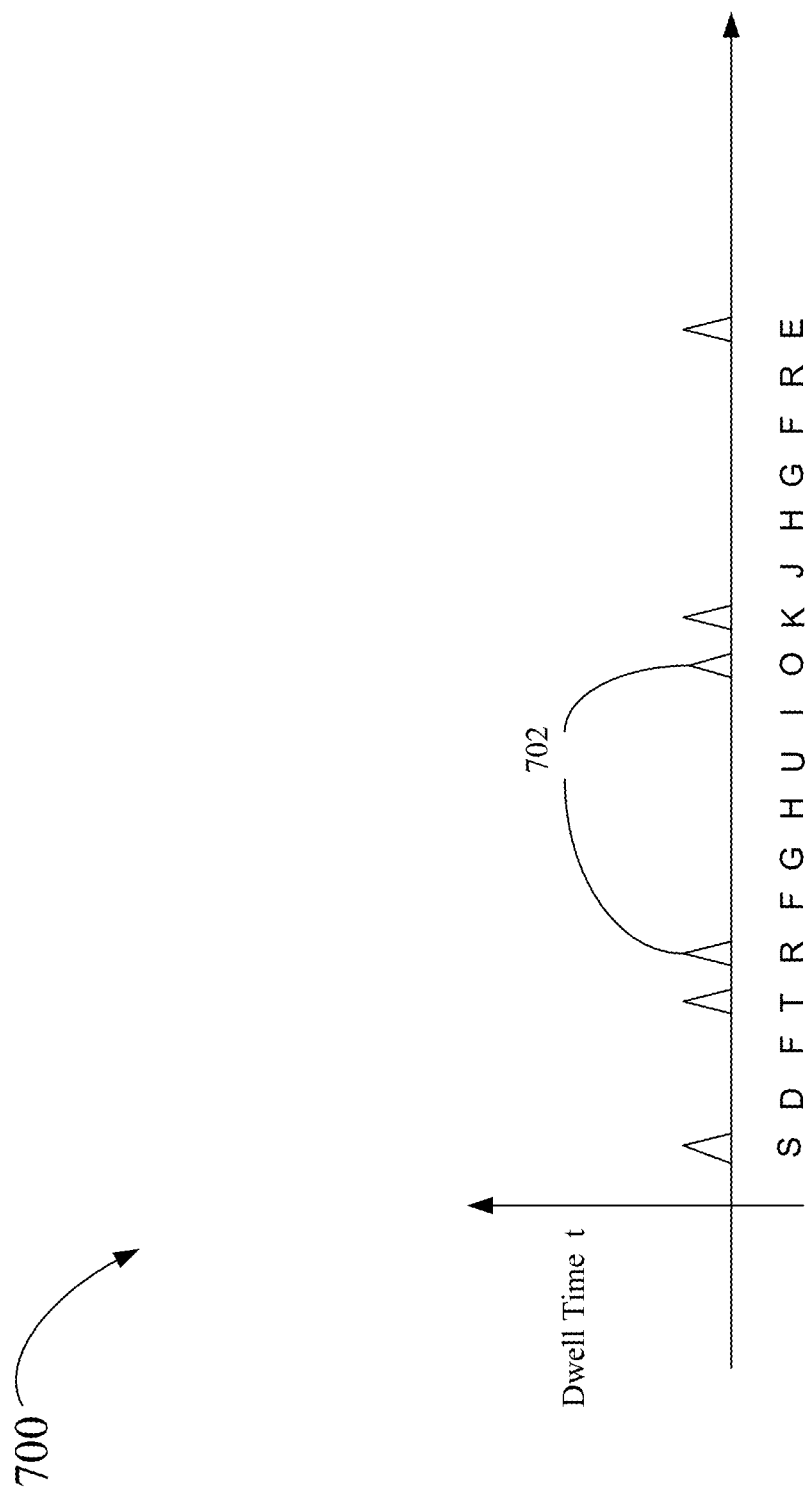
FIG. 7 is a graph illustrating dwell times corresponding to letters associated with the performed gesture of FIG. 6.

Recognizing that a typical input gesture stroke may not be a perfect polyline made of straight lines connected by vertices, computing system 105 is configured to simplify the input stroke by removing extraneous data, such as jitter, so as to facilitate easier comparison with the predefined strokes. In a particular embodiment, computing system 105 is configured to simplify the input stroke by identifying dwell points 606, shown in FIG. 6, in the input stroke, such as the individual letters of the word "STROKE" 604, as at block 806, and generating a polyline that has those dwell points as its vertices, at block 808. As shown in FIG. 7, dwell points may be detected when the user dwells on a letter to some detectable extent of time. Due to the nature of how the user targets individually the letters of a word, the user may pause slightly, thereby generating dwell times 702 associated with the detected dwell points.

Computing system 105 may then compare that resulting simplified stroke with the predefined strokes to find a closest match. For instance, computing system 105 may take the N generated equidistant points along the simplified stroke, at block 814, and compare those points pairwise with the N points representing each predefined stroke, at block 816. For the pairwise point comparison, the computing system may be configured to evaluate an average sum of the squares of the distances between the paired points of the simplified and predefined strokes, and to select the predefined stroke for which the least difference exists, at block 818. Further, a language model could be used to resolve ambiguity in this selection process.

During operation, when the user drags his/her finger on keyboard 404 at a substantially constant rate, input unit 124, computing system 105 is configured to analyze the gesture stroke detected by input unit 124 to determine dwelling times 702, thereby identifying corresponding dwell points, as shown in FIG. 7.

Figure 9:
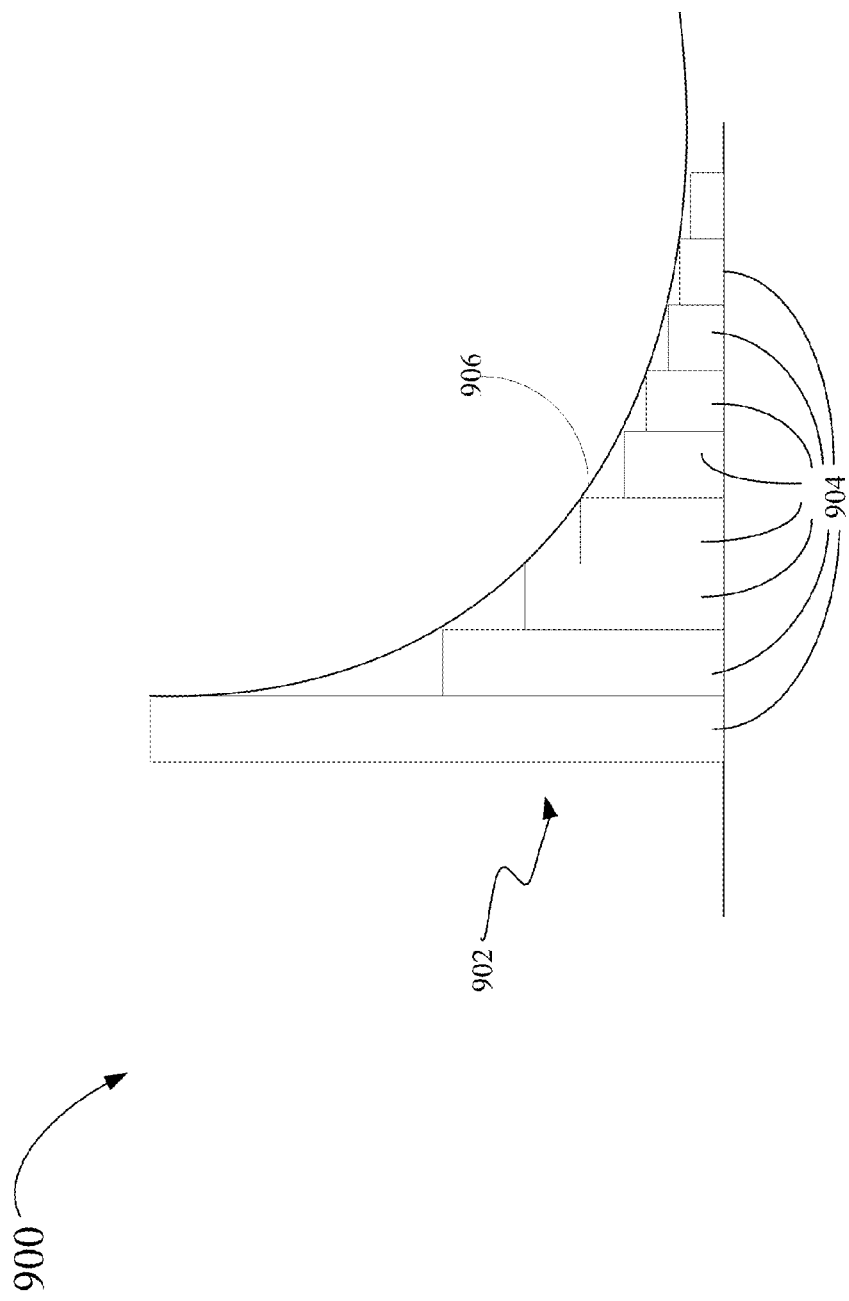
FIG. 9 is a graph illustrating an example embodiment of a histogram defining inter-coordinates distances between sequential points on the performed gesture stroke of FIG. 6.

Computing system 105 further evaluates distances separating sequential pairs of sensor input points, which are separated in time by the constant rate provisioning. That is, inter-coordinate distances for consecutive pairs of coordinates are evaluated. Computing system 105 is then configured to generate a histogram based on these inter-coordinate distances. Because closer or more proximate sequential pairs of input points 608 are located near dwell points 606, as shown in FIG. 6, the generated histogram may have an "L" shape. As shown in FIG. 9, by connecting successive columns 904 of the generated histogram 902, a curve 904, having an elbow 906, is generated. Points with coordinates near those of the letters of interest are to the left of elbow 906, and points with coordinates distant from those of the letters of interest are to the right elbow 906.

Near elbow 906, to identify the letters of interest, computing system 105 determines a dwell point threshold distance, such that points that are located at a distance less than or equal to the threshold distance, are determined to be potentially associated with letters of the intended word, and the remaining points are discarded. Consecutive sets of points associated with potential letters of the intended word are grouped together in a sequence of points. When the endpoints of the sequence are not identical, computing system 105 reduces the sequence to the endpoints. When the endpoints are identical, computing system 105 reduces the sequence to a single endpoint. Computing system 105 further combines the endpoints together to reduce the user's input stroke to a set of straight line segments, which may be referred to as a simplified stroke. Computing system 105 is configured to re-sample the simplified stroke to identify N equidistant points, as discussed above, in order to perform a comparison between the simplified stroke and the set of predefined stroke templates.

In one embodiment, for the comparison between the simplified stroke and the set of predefined stroke templates, computing system 105 is configured to avoid comparing against all stroke templates, as that could be prohibitively costly in time and unnecessary in most cases. Because the user lifts his/her finger when close to the last letter of the intended word, computing system 105 may filter out the predefined stroke templates for words that do not end near the coordinates as that of the evaluated simplified stroke, at block 812. For each remaining stroke template, as stated above, N equidistant points are compared one to one to those of the simplified stroke, at block 816. Computing system 104 then uses the above-discussed average sum of the square of the distances between each pair of points, with one pair point associated with simplified stroke and the other pair point associated with the remaining stroke template, as an error metric for matching each remaining template to the simplified stroke, at block 818. The remaining set of stroke templates is then ordered using the error metric in ascending order. In case the error metric for one of the remaining stroke templates is less than the predetermined certainty or accuracy threshold, at block 820, then computing system 105 enters the corresponding word without requiring the user to manually select the best matching stroke template, at block 822. On the other hand, if no error metric is less than or equal to the certainty threshold, then computing system 105 presents the user with a list of top words, corresponding to lowest error metrics, at block 824. The user may then select the intended word, if on the list.

In one embodiment, computing system 105 is configured to measure a total length of the simplified stroke, and to filter out predefined stroke templates that have a total length that is greater than a predetermined length difference threshold.

In another embodiment, computing system 105 is configured to recognize that the user may land on the keyboard at a location other than that of the first letter of the intended word. In this event, computing system 105 may determine a line segment from the landing location to the first subsequent determined dwell point, and may add that line segment to the beginning of each predefined stroke template with which the simplified stroke is to be compared. As such, when the landing location is not the intended location, computing system 105 may still perform the matching of the simplified stroke with a predefined stroke template. When the landing location is substantially near the intended location, computing system 105 may disregard the substantially negligible line segment, as its impact on the stroke comparison is minimal.

In yet another embodiment, recognizing that the user may input a continuous stroke representing a continuous sequence of words separated only by a spacebar or the like, the computing system may disregard the line segments from and to the spacebar, i.e., from the last dwell point and to a first subsequent dwell point.

In one embodiment, input unit 122 may be configured to generate a visible response to the user's finger or stylus interaction with keyboard 404. For example, when the user's finger or stylus lands on keyboard 404, input unit 122 may animate a collapsing circle around the landing location, like a reverse sonar wave. This circle animation can help the user figure out where he/she has contacted keyboard 404.

In a further variation, as the user moves his/her finger or stylus on keyboard 404, an empty circle can be represented. When the user dwells on a particular letter, the circle may start to fill in from its center or may fill in like a growing slice of a pie or a sweeping clock hand. Alternately, instead of filling, the circle may fade when the user dwells on a particular letter.

In another embodiment, instead of using a finger or a stylus, the user moves a cursor on keyboard 404 to generate a gesture stroke.

Figure 10:
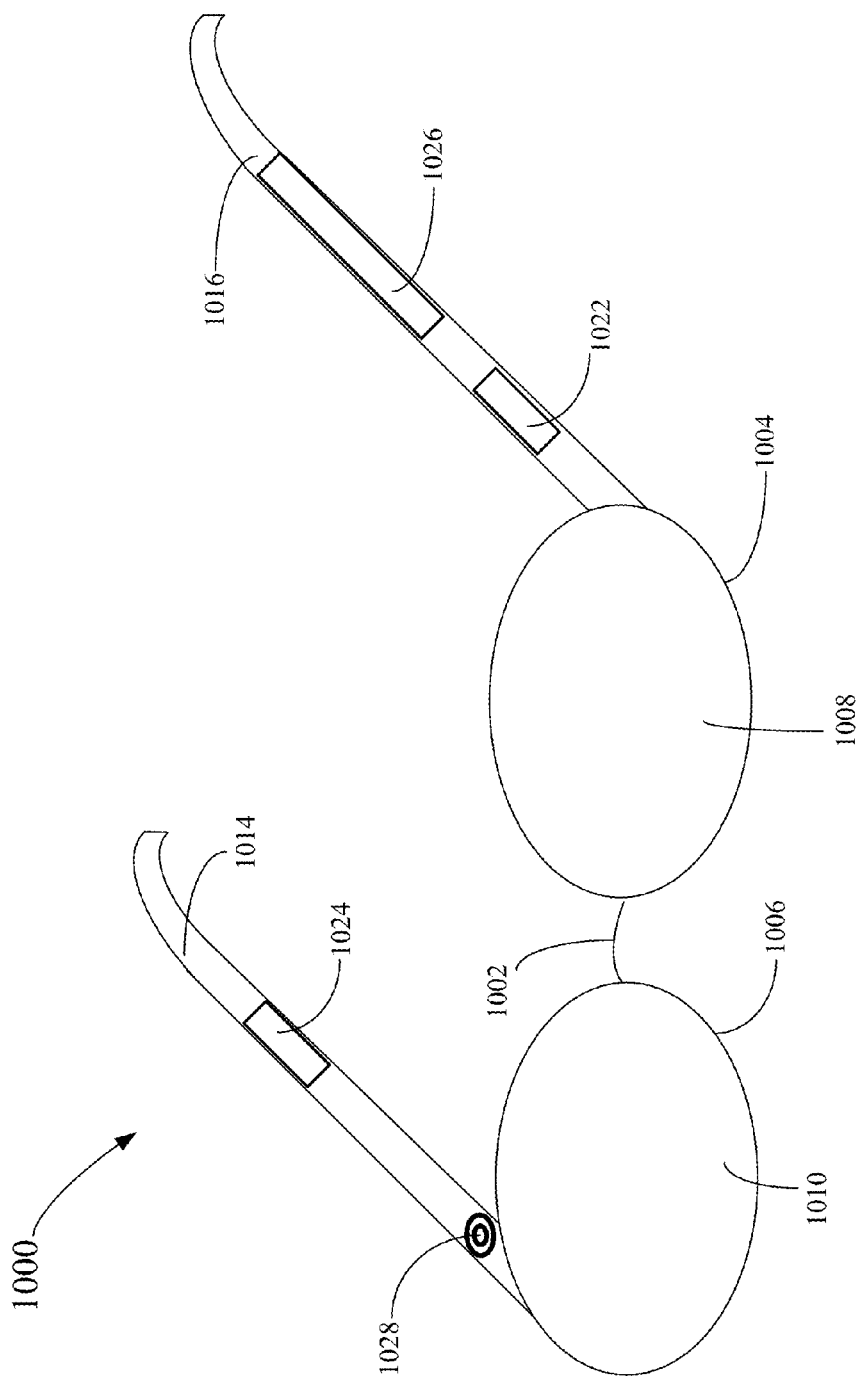
FIG. 10 illustrates an embodiment of a head-wearable display device with an integrated input device.

The above discussed method and system for determining a word input by a gesture stroke on a virtual keyboard may be implemented in various arrangements. One such arrangement may include a head wearable display device 1000, as shown in FIG. 10. Head wearable display device 1000, which is suitable for continuous, daily use as a wearable personal electronics device, includes a pair of glasses 1002. While FIG. 10 illustrates glasses 1002 as an example of head wearable display device 1000, other types of head wearable display devices could additionally or alternatively be used. In addition, other non-head wearable electronic devices, such as a wrist watch, or other non-wearable electronic devices, such as a mobile phone or laptop computer could be used.

As illustrated in FIG. 10, glasses 1002 comprise frame elements including lens frames 1004, 1006, respective lens elements or display units 1008 and 1010, a center frame support 1012, two stems or temples 1014 and 1016, and planar direction input units 1022, 1024. The center support 1012 and the two rearward extending stems 1014 and 1016 are configured to secure the glasses 1002 to a user's face via a user's nose and ears, respectively. Each of the frame elements 1004, 1006, 1012 and stems 1014, 1016 may be formed of a solid structure of plastic, metal, ceramic, etc., or may be formed of a hollow structure of similar material so as to allow wiring and component interconnects to be internally routed through glasses 1002. Each of stems 1014 and 1016 is an example of a projection that extends away from a display element and is used to secure the display element to a user.

As shown in FIG. 10, glasses 1002 further include a computing device 1026 and a miniature projector unit 1028 coupled to an inside-surface of stem 1014 and configured to project a display onto an inside-surface of display unit 1008. Computing device 1026 includes a processor unit and a memory unit (not shown). In one embodiment, computing device 1026 may be incorporated into glasses 1002. In another embodiment, computing device 1026 may be a head-mounted computing device incorporated into, for example, a hat or helmet, or may be a body-mounted computing device incorporated into, for example, a waist-mounted mobile phone or personal digital assistant. Computing device 1026 is coupled to planar direction input units 1022, 1024 and to miniature projector unit 1028. As such, computing device 1026 is configured to transmit input received from planar direction input devices 1022, 1024, and to transmit display data to miniature projector unit 1028 for display on display unit 1008. Additionally, glasses 1002 may further include a movement sensor (not shown), and a microphone (not shown), among other possible input units.

During operation, the user may drag his finger on one of the planar direction input devices 1022, 1024 to generate a gesture stroke, which is communicated to processor unit 118, for determination of the intended word.

Figure 11:
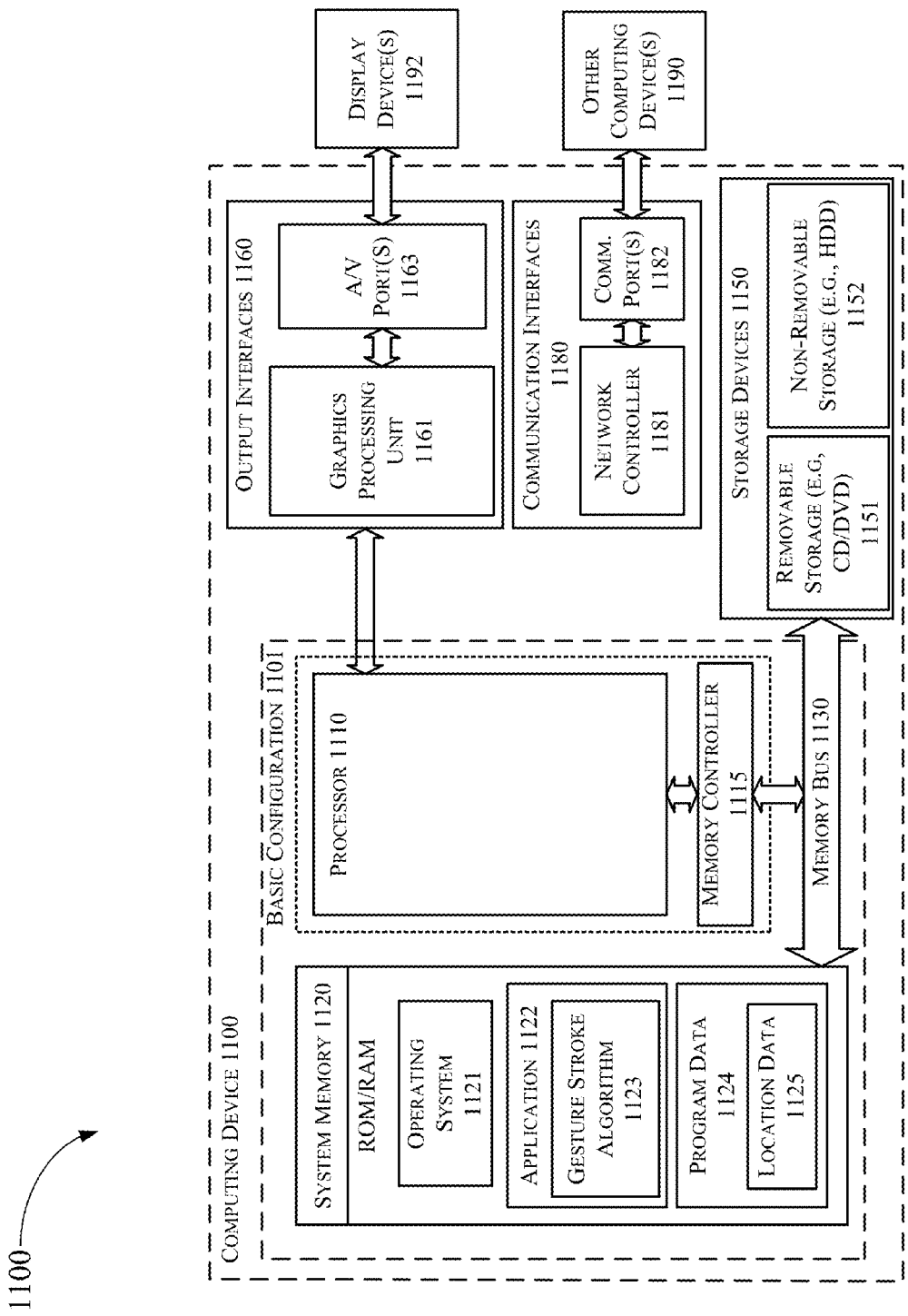
FIG. 11 is a functional block diagram illustrating an example computing device of FIG. 1.

In accordance with an embodiment of the method for determining a word input by a gesture stroke on a virtual keyboard, computing system 105 includes memory unit 110, which in turn includes a non-transitory computer readable storage medium, discussed hereafter with regard to FIG. 11 that contains instructions that cause computing system 105 to perform the method.

FIG. 11 is a functional block diagram illustrating an example computing device 1100 used in a computing system 100 that is arranged in accordance with at least some embodiments described herein. The computing device may be a personal computer, mobile device, cellular phone, video game system, or global positioning system. In an example configuration 1101, computing device 1100 may include one or more processors 1110 and system memory 1120. A memory bus 1130 can be used for communicating between the processor 1110 and the system memory 1120. Depending on the desired configuration, processor 1110 can be of any type including but not limited to a microprocessor (µP), a microcontroller (µC), a digital signal processor (DSP), or any combination thereof. A memory controller 1115 can also be used with the processor 1110, or in some implementations, the memory controller 1115 can be an internal part of the processor 1110.

Depending on the desired configuration, the system memory 1120 can be of any type including but not limited to volatile memory (such as RAM), non-volatile memory (such as ROM, flash memory, etc.) or any combination thereof. System memory 1120 typically includes one or more applications 1122, and program data 1124. Application 1122 may include a virtual scrolling algorithm 1123 that is arranged to provide inputs to the electronic circuits, in accordance with the present disclosure. Program Data 1124 may include location data 1125 that could provide location data to the electronic circuits. In some example embodiments, application 1122 can be arranged to operate with program data 1124 on an operating system 1121. This described basic configuration is illustrated in FIG. 11 by those components within dashed line 1101. Operating systems are generally well known and will not be described in greater detail. The operating system can also be a special purpose operating system, such as may be used for limited purpose appliance-type computing devices.

Computing device 1100 can have additional features or functionality, and additional interfaces to facilitate communications between the basic configuration 1101 and any devices and interfaces. For example, the data storage devices 1150 can be removable storage devices 1151, non-removable storage devices 1152, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, removable and non-removable media implemented in any method or technology for storage of information, such as computer readable instructions, data structures, program modules, or other data.

System memory 1120, removable storage 1151, and non-removable storage 1152 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media can be part of device 1100.

Computing device 1100 can also include output interfaces 1060 that may include a graphics processing unit 1161, which can be configured to communicate to various external devices such as display devices 1192 or speakers via one or more A/V ports 1163 or a communication interface 1180. Communication interface 1180 may include a network controller 1181, which can be arranged to facilitate communications with one or more other computing devices 1190 over a network communication via one or more communication ports 1182. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1100 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1100 can also be implemented as a personal computer including both laptop computer and non-laptop computer configurations.

It should be further understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

Figure 12:
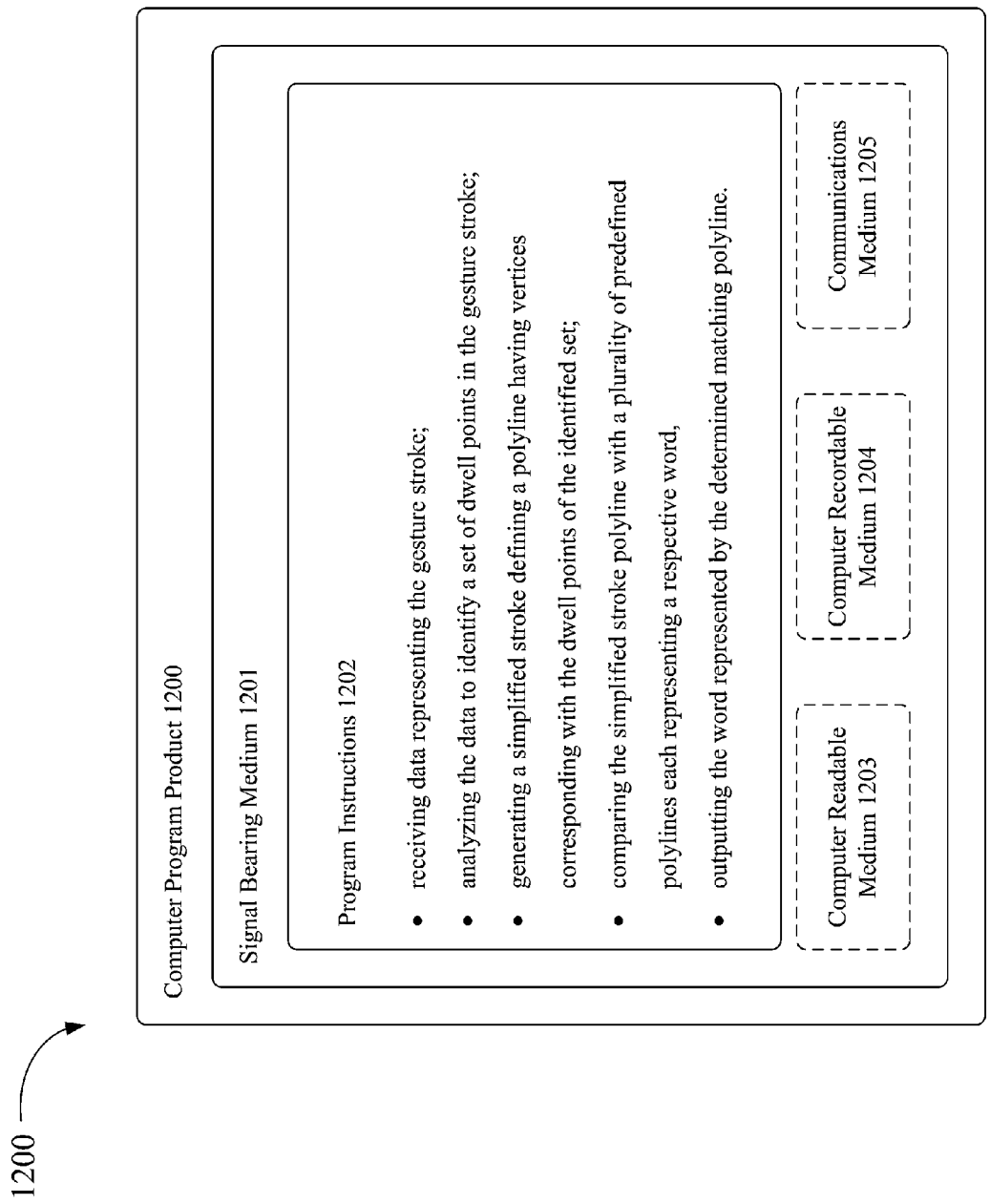
FIG. 12 is a schematic diagram illustrating a conceptual partial view of an example computer program associated with the method of FIGS. 5 and 8.

In some embodiments, the disclosed methods may be implemented as computer program instructions encoded on a computer-readable storage media in a machine-readable format. FIG. 12 is a schematic illustrating a conceptual partial view of an example computer program product 1200 that includes a computer program for executing a computer process on a computing device, arranged according to at least some embodiments presented herein. In one embodiment, the example computer program product 1200 is provided using a signal bearing medium 1201. The signal bearing medium 1201 may include one or more programming instructions 1202 that, when executed by one or more processors may provide functionality or portions of the functionality described above with respect to FIGS. 1-11. Thus, for example, referring the embodiment shown in FIGS. 5 and 8, one or more features of blocks 502, 504, 506, 508, 510, 512, 514, 516, 518, 520, 522, and/or 524, and 802, 804, 806, 808, 810, 812, 814, 816, 818, 820, 822, and/or 824 may be undertaken by one or more instructions associated with the signal bearing medium 1201.

In some examples, the signal bearing medium 1201 may encompass a non-transitory computer-readable medium 1203, such as, but not limited to, a hard disk drive, a Compact Disc (CD), a Digital Video Disk (DVD), a digital tape, memory, etc. In some implementations, the signal bearing medium 1201 may encompass a computer recordable medium 1204, such as, but not limited to, memory, read/write (R/W) CDs, R/W DVDs, etc. In some implementations, the signal bearing medium 1201 may encompass a communications medium 1205, such as, but not limited to, a digital and/or an analog communication medium (e.g., a fiber optic cable, a waveguide, a wired communications link, a wireless communication link, etc.). Thus, for example, the signal bearing medium 1201 may be conveyed by a wireless form of the communications medium 1205 (e.g., a wireless communications medium conforming with the IEEE 802.11 standard or other transmission protocol).

The one or more programming instructions 1202 may be, for example, computer executable and/or logic implemented instructions. In some examples, a computing device such as the computing device 1200 of FIG. 12 may be configured to provide various operations, functions, or actions in response to the programming instructions 1202 conveyed to the computing device 1200 by one or more of the computer readable medium 1203, the computer recordable medium 1204, and/or the communications medium 1205.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. In a computing system, a method for determining a word input by a gesture stroke on a virtual keyboard, the method comprising:
   receiving data representing the gesture stroke;
   analyzing, via a processor, the received data to identify a set of dwell points in the gesture stroke;
   generating a simplified stroke polyline, wherein the simplified stroke polyline comprises vertices corresponding with the set of dwell points;
   determining an initial-line segment of the simplified stroke polyline, wherein the initial-line segment defines a segment from a landing location of the gesture stroke to a first identified dwell point from the set of dwell points;
   comparing the simplified stroke polyline with a plurality of predefined polylines each representing a respective word, to determine a closest matching predefined polyline, wherein the comparing comprises (i) adding the initial line-segment to each of the predefined polylines to generate enhanced predefined polylines and (ii) comparing the simplified stroke polyline with the enhanced predefined polylines; and
   the computing system outputting the word represented by the closest matching predefined polyline.

2. The method of claim 1, wherein analyzing the received data to identify the set of dwell points in the gesture stroke comprises:
   comparing successive pairs of sample points of the gesture stroke to identify pairs of the sample points that are separated by a distance that is less than or equal to a threshold distance, and using the identified pairs as a basis to define the dwell points.

3. The method of claim 1, wherein comparing the simplified stroke polyline with the plurality of predefined polylines to determine the closest matching predefined polyline further comprises:
   sampling each of the plurality of predefined polylines to generate a corresponding first set of N equidistant points;
   sampling the simplified stroke polyline to generate a second set of N equidistant points; and
   for each of the plurality of predefined polylines, (i) determining a plurality of N pair separating distances for the N pairs of points, wherein for each of the N pairs of points one point is selected from the corresponding first set of N equidistant points and the other point is selected from the second set of N equidistant points, (ii) evaluating a power summation of the N pair-separating distances, and (iii) comparing the power summation to a predetermined word certainty threshold value.

4. The method of claim 1, wherein comparing the simplified stroke polyline with the plurality of predefined polylines to determine the closest matching predefined polyline further comprises:
   determining a first length of the simplified stroke polyline;
   for each of the plurality of predefined polylines, determining a corresponding second length;
   comparing the first length to each of the plurality of second lengths to determine a corresponding length difference;
   determining corresponding length differences that are greater than a predetermined length difference threshold; and
   filtering out predefined polylines associated with the determined corresponding length differences that are greater than the predetermined length difference threshold.

5. In a computing system, a method for determining a word input by a gesture stroke on a virtual keyboard, the method comprising:
   receiving data representing the gesture stroke;
   analyzing, via a processor, the received data to identify a set of dwell points in the gesture stroke;
   generating a simplified stroke defining a polyline having vertices corresponding with the set of dwell points;
   determining that the generated simplified stroke polyline represents a plurality of input words;
   dividing the generated simplified stroke polyline into a plurality of sub-polylines, each of which corresponding to one of the plurality of input words;
   comparing each individual sub-polyline with a plurality of predefined polylines each representing a respective word, to determine a closest matching predefined polyline; and
   for each individual sub-polyline, the computing system outputting a word represented by the closest matching polyline.

6. A non-transitory computer readable storage medium having stored therein instructions executable by one or more processors to cause a computing system to perform functions for determining a word input by a gesture stroke on a virtual keyboard, the functions comprising:
   receiving data representing the gesture stroke;
   analyzing the received data to identify a set of dwell points in the gesture stroke;
   generating a simplified stroke polyline, wherein the simplified stroke polyline comprises vertices corresponding with the set of dwell points;
   determining an initial-line segment of the simplified stroke polyline, wherein the initial-line segment defines a segment from a landing location of the gesture stroke to a first identified dwell point from the set of dwell points;
   comparing the simplified stroke polyline with a plurality of predefined polylines each representing a respective word, to determine a closest matching predefined polyline, wherein the comparing comprises (i) adding the initial line-segment to each of the predefined polylines to generate enhanced predefined polylines and (ii) comparing the simplified stroke polyline with the enhanced predefined polylines; and
   outputting the word represented by the closest matching predefined polyline.

7. The non-transitory computer readable storage medium of claim 6, wherein analyzing the received data to identify the set of dwell points in the gesture stroke comprises:

comparing successive pairs of sample points of the gesture stroke to identify pairs of the sample points that are separated by a distance that is less than or equal to a threshold distance, and using the identified pairs as a basis to define the dwell points.

8. The non-transitory computer readable storage medium of claim 6, wherein comparing the simplified stroke polyline with a plurality of predefined polylines each representing a respective word, to determine a closest matching predefined polyline further comprises:

sampling each of the plurality of predefined polylines to generate a corresponding first set of N equidistant points;

sampling the simplified stroke polyline to generate a second set of N equidistant points; and for each of the plurality of predefined polylines, (i) determining a plurality of N pair-separating distances for the N pairs of points, wherein for each of the N pairs of points one point is selected from the corresponding first set of N equidistant points and the other point is selected from the second set of N equidistant points, (ii) evaluating a power summation of the N pair-separating distances, and (iii) comparing the power summation to a predetermined word certainty threshold.

9. The non-transitory computer readable storage medium of claim 6, wherein comparing the simplified stroke polyline with the plurality of predefined polylines to determine the closest matching predefined polyline further comprises:

determining a first length of the simplified stroke polyline;

for each of the plurality of predefined polylines, determining a corresponding second length;

comparing the first length to each of the plurality of second lengths to determine a corresponding length difference;

determining corresponding length differences that are greater than a predetermined length difference threshold; and filtering out predefined polylines associated with the determined corresponding length differences that are greater than the predetermined length difference threshold.

10. A head-mountable computing device, comprising:

a display for displaying keys constituting a virtual keyboard;

a touch pad configured to generate a signal generated by a touch point on the touchpad in an area associated with the virtual keyboard;

a processor coupled to the display and the touch pad; and a memory unit for storing program instructions executable by the processor to perform functions for determining a word input by a gesture stroke on the virtual keyboard, the functions comprising:

a) receiving data representing the gesture stroke, b) analyzing the received data to identify a set of dwell points in the gesture stroke, c) generating a simplified stroke polyline, wherein the simplified stroke polyline comprises vertices corresponding with the set of dwell points, d) determining an initial-line segment of the simplified stroke polyline, wherein the initial-line segment defines a segment from a landing location of the gesture stroke to a first identified dwell point from the set of dwell points, e) comparing the simplified stroke polyline with a plurality of predefined polylines each representing a respective word, to determine a closest matching predefined polyline, wherein the comparing comprises (i) adding the initial line-segment to each of the predefined polylines to generate enhanced predefined polylines and (ii) comparing the simplified stroke polyline with the enhanced predefined polylines, and f) outputting the word represented by the closest matching predefined polyline.

11. The head-mountable computing device of claim 10, wherein analyzing the data to identify the set of dwell points in the gesture stroke comprises:

comparing successive pairs of sample points of the gesture stroke to identify pairs of the sample points that define a threshold short distance, and using the identified pairs as a basis to define the dwell points.

12. The head-mountable computing device of claim 10, wherein comparing the simplified stroke polyline with a plurality of predefined polylines each representing a respective word, to determine a closest matching predefined polyline further comprises:

sampling each of the plurality of predefined polylines to generate a corresponding first set of N equidistant points;

sampling the simplified stroke polyline to generate a second set of N equidistant points;

for each of the plurality of predefined polylines, determining a plurality of N pair-separating distances of the N pairs of points, wherein for each of the N pairs of points one point is selected from the corresponding first set of N equidistant points and the other point is selected from the second set of N equidistant points; and evaluating a power summation of the N pair-separating distances and comparing the power summation to a predetermined word certainty threshold to determine the closest matching predefined polyline.

13. The head-mountable computing device of claim 10, wherein comparing the simplified stroke polyline with the plurality of predefined polylines to determine the closest matching predefined polyline further comprises:

determining a first length of the simplified stroke polyline;

for each of the plurality of predefined polylines, determining a corresponding second length;

comparing the first length to each of the plurality of second lengths to determine a corresponding length difference;

determining corresponding length differences that are greater than a predetermined length difference threshold; and filtering out predefined polylines associated with the determined corresponding length differences that are greater than the predetermined length difference threshold.

\* \* \* \* \*